(No Model.)
R. J. BUCHANAN.
ROTARY MEASURING WHEEL.
No. 399,966. Patented Mar. 19, 1889.
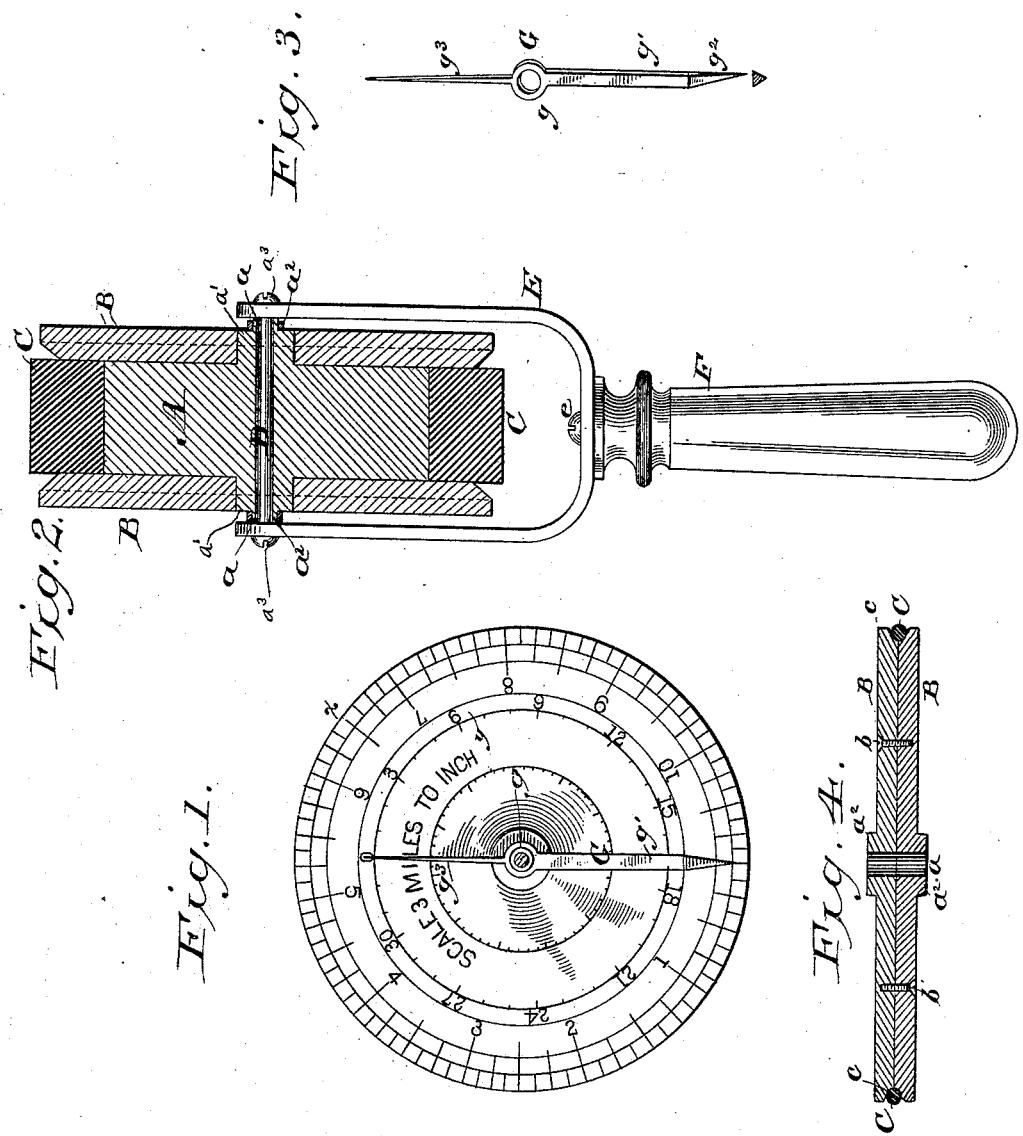
Witnesses.
H. C. Newman.
E. S. Newman.
Inventor,
Robert J. Buchanan
By his Attorneys
Baldwin, Davidson & Wight.

United States Patent Office.

ROBERT JARVIE BUCHANAN, OF PITTSBURG, PENNSYLVANIA.

ROTARY MEASURING-WHEEL.

SPECIFICATION forming part of Letters Patent No. 399,966, dated March 19, 1889.

Application filed February 12, 1889. Serial No. 299,631. (No model.)

*To all whom it may concern:*

Be it known that I, ROBERT JARVIE BUCHANAN, a subject of the Queen of Great Britain, residing in Pittsburg, in the county of Allegheny and State of Pennsylvania, have invented certain new and useful Improvements in Rotary Measuring-Instruments, of which the following is a specification.

The object of my invention is to provide a simple and reliable instrument for measuring or calculating distances on maps, charts, plans, or similar surfaces.

In carrying out my invention I provide a disk, wheel, or roller having its side or sides marked near the periphery with a scale made in accordance with some unit of measure—such as inches—and an additional scale or additional scales within the outer scale divided to indicate distances calculated by a larger unit of measure—such as miles. The disk, wheel, or roller is mounted in suitable bearings which are connected with a frame having a handle, by means of which the rotary measure may be moved along the surface to which it is applied. A pointer or index is pivoted concentric with the rotary measure and indicates on the scales the distance moved.

Other features of my invention and the details of construction will be hereinafter more particularly specified.

In the accompanying drawings, Figure 1 is an elevation of one side of the disk, wheel, or roller, showing the scales on its face and the pointer or index which is pivoted concentric with the disk. Fig. 2 is a longitudinal central section through the disk, wheel, or roller, showing the frame and handle in elevation. Fig. 3 is a detail view of the pointer, and Fig. 4 illustrates a modification.

The disk, wheel, or roller is preferably constructed as follows: As shown in Fig. 2, a bushing or core, A, of suitable material—such as brass, wood, or vulcanized fiber—is formed with a central shaft-opening, $a$, and with laterally-projecting bosses $a'$. On each side of the bushing is secured a circular plate, B, which is provided with apertures, through which extend the bosses $a'$. The plates B extend beyond the outer edge or circumference of the bushing A, and their edges are preferably formed, as shown, straight or plain on the outer sides and tapered or beveled downwardly or inwardly on their inner sides.

Between the plates B, and closely surrounding the bushing A, is secured a rim or tire, C, preferably of some soft material—such as soft vulcanized rubber—and this rim or tire projects a slight distance beyond the peripheries of the disks. A shaft or axle, D, extends through the central opening in the bushing A and its bosses $a'$, and is secured at its outer ends to a U-shaped frame, E, to which is secured, by means of a screw, $e$, a handle, F. The bosses $a'$ have laterally-projecting extensions $a^2$, which are preferably of smaller diameter than the main portion of the bosses, and on these extensions are pivoted the indexes or pointers G. One of these pointers is shown separately in Fig. 3. As will be seen, it consists of central hub, $g$, from which extends downwardly a straight arm, $g'$, made sufficiently heavy to hold it in an upright position. The pointer, which is preferably triangular in cross-section, is tapered or beveled at its outer end from its front face downwardly to the apex or knife-edge at the rear face to form a triangular index, $g^2$, at that end which lies close to the scale on the outer edge of the plate. A second index or pointer, $g^3$, extends from the hub $g$ in an opposite direction to that of the pointer $g'$, and is made narrow and light, so as not to counterbalance the pointer $g'$ and not to cover up the scale or scales in connection with which it is used.

In the drawings I have shown the pointer $g^3$ as gradually tapering from its inner end outwardly, as I prefer this construction. As before stated, two of these pointers are employed—one on each side of the rotary marker—being hung freely from the extensions $a^2$ of the bosses. The indexes or pointers thus always maintain a perpendicular position or direction and the rotary marker moves relatively to the pointers on each side. The screws $a^3$, which secure the frame E to the roller, are removable, so that the disks, frame, and indexes may be separated and other disks having differently-marked scales may be substituted.

The disks B may be divided into scales, as indicated in Fig. 1. As seen in this figure, a circular scale, $x$, divided and graduated into inches and fractions of an inch, is formed around the edge or periphery of the disk. Within this circular scale $x$ is a second scale, $y$, (shown as divided,) to indicate miles and fractions thereof. As represented, it is graduated to indicate three miles to the inch, so that when the measuring disk, wheel, or roller is moved one inch on a surface to which it is applied when scaled to three miles to the inch the index on the inner scale will indicate a distance of three miles traversed.

It is obvious that any other unit of measure may be employed for either scale; but I prefer that shown and described, as my invention is especially designed for measuring distances on maps and plans. By having a disk and index on each side of the instrument, and as each disk may have several scales, it may be made to measure surfaces laid out on different scales. The disks are removable or interchangeable, so that others differently marked or scaled may be substituted. Thus the instrument may be used in connection with maps, charts, &c., having different units of measurement or made to different scales. By employing a yielding tire for the wheel the instrument is not apt to slip, but will move truly over the surface to which it is applied, the edges of the disks being beveled or inclined. When the instrument is applied to a surface being measured, the tire will be compressed within the recesses formed by the bevels, so that the edges of the disks will move along the surface, and in this way a true and uniform measurement may be obtained, while the soft flexible tire enables the instrument to take a firm hold without slipping upon the measured surface.

In Fig. 4 I have shown a slight modification of the instrument, in which two metallic disks, B, are directly connected by attaching devices $b$. A tire, C, circular in cross-section, is seated in a recess, $c$, between the disks at their periphery and projects a slight distance beyond it. $a$ indicates the shaft-opening, and $a^2$ the bosses or bearings for the indexes or pointers.

I claim as of my own invention—

1. The combination, substantially as hereinbefore set forth, of the frame, its handle, the rotary disk, wheel, or roller pivoted to the frame and having scales of distances marked on its side, and an index or pointer pivoted concentric with the disk, wheel, or roller and weighted and pointed at its lower end.

2. The combination, substantially as hereinbefore set forth, of the frame, the rotary disk, wheel, or roller, the scale marked on its side and near its periphery in accordance with one unit of measure, a second scale or scales within the outer scale divided according to a different unit or different units of measure, and an index or pointer pivoted concentric with the disk, wheel, or roller, having its lower arm weighted and pointed and extending to the outer scale and its upper arm made light, narrow, and pointed, and extending to the inner scale or scales, for the purpose herein specified.

3. The combination, substantially as hereinbefore set forth, of the bushing or core, the circular graduated plates on each side of the bushing and beveled on their inner sides at the periphery, the tire or rim of soft flexible material between the plates and around the bushing or core and extending beyond the edges of the plates, the bosses of the bushing extending centrally through the plates, the axle or shaft, the frame to which it is secured, and an index or pointer pivoted concentric with the circular graduated plates.

4. The combination, substantially as hereinbefore set forth, of the central bushing or core, its laterally-projecting bosses having the extensions $a^2$, the metallic plates secured to the bushing around the bosses and having their inner sides tapered or beveled, as described, and marked on their outer sides with scales divided in accordance with suitable units of measure, the tire or rim of soft flexible material secured around the bushing and between the plates and extending beyond the outer edges or peripheries of the plates, the frame, its handle, the axle secured to the frame and extending through the bushing and its extensions, and the indexes or pointers pivoted on the extensions $a^2$.

5. The combination, substantially as hereinbefore set forth, of the disk, wheel, or roller, having a circular scale on its side and around its periphery divided into inches and a circular scale within the outer scale divided proportionately to represent miles, the frame to which the disk, wheel, or roller is pivoted, and the freely-suspended pointer or index adjacent to the disk, wheel, or roller.

In testimony whereof I have hereunto subscribed my name.

ROBERT JARVIE BUCHANAN.

Witnesses:
D. BUCHANAN,
W. HASTINGS.